US011924111B2

(12) United States Patent
Shibata et al.

(10) Patent No.: US 11,924,111 B2
(45) Date of Patent: Mar. 5, 2024

(54) SIGNAL TRANSFER DEVICE AND SIGNAL TRANSFER METHOD

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Noriyuki Ota, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 105 days.

(21) Appl. No.: 17/595,918

(22) PCT Filed: Jun. 3, 2019

(86) PCT No.: PCT/JP2019/022013
§ 371 (c)(1),
(2) Date: Nov. 29, 2021

(87) PCT Pub. No.: WO2020/245883
PCT Pub. Date: Dec. 10, 2020

(65) Prior Publication Data
US 2022/0263762 A1 Aug. 18, 2022

(51) Int. Cl.
*H04L 47/22* (2022.01)
*H04L 43/0888* (2022.01)
(Continued)

(52) U.S. Cl.
CPC ........ *H04L 47/225* (2013.01); *H04L 43/0888* (2013.01); *H04L 49/90* (2013.01); *H04Q 2011/0083* (2013.01)

(58) Field of Classification Search
CPC ..... H04L 47/22; H04L 48/90; H04L 43/0888; H04L 12/46; H04L 47/24; H04L 49/9047;
(Continued)

(56) References Cited

U.S. PATENT DOCUMENTS

| 6,862,298 B1* | 3/2005 | Smith | H04L 43/087 |
| | | | 370/429 |
| 6,876,629 B2* | 4/2005 | Beshai | H04L 49/3081 |
| | | | 370/232 |

(Continued)

FOREIGN PATENT DOCUMENTS

| JP | H06133381 A | 5/1994 |
| JP | H1079741 A | 3/1998 |
| JP | 5876941 B2 | 3/2016 |

OTHER PUBLICATIONS

LAN/MAN Standards Committee of the IEEE Computer Society, "Time-Sensitive Networking for Fronthaul". IEEE Std 802. 1CM-2018, IEEE Standard for Local and metropolitan area networks-, May 7, 2018.

*Primary Examiner* — Man U Phan
(74) *Attorney, Agent, or Firm* — Harness, Dickey & Pierce, P.L.C.

(57) ABSTRACT

A buffer unit including a plurality of buffers, a sorting unit configured to sort an input signal to any of the plurality of buffers based on header information, a rate calculation unit configured to calculate a rate at which the input signal is read from each of the plurality of buffers based on burst information of the input signal, an adjustment unit configured to adjust a rate at which the input signal is read from each of the plurality of buffers based on the rate calculated by the rate calculation unit, and a transfer unit configured to transfer the signal read from each of the plurality of buffers are provided.

8 Claims, 8 Drawing Sheets

(51) Int. Cl.
*H04L 49/90* (2022.01)
*H04Q 11/00* (2006.01)

(58) Field of Classification Search
CPC .............. H04L 47/125; H04L 49/9042; H04L 49/9063; H04L 47/828; H04L 47/32; H04L 1/00; H04L 1/0041; H04L 69/22; H04L 1/0073; H04L 1/007; H04W 28/02; H04W 28/06; H04W 40/24; H04W 72/10; G06F 12/0888; G06F 3/0652; H04J 3/06
USPC ........................................................ 370/235
See application file for complete search history.

(56) References Cited

U.S. PATENT DOCUMENTS

| | | | | |
|---|---|---|---|---|
| 7,292,580 | B2* | 11/2007 | Ramamurthy | H04L 12/5601 |
| | | | | 370/395.42 |
| 7,620,044 | B2* | 11/2009 | Choi | H04J 14/0227 |
| | | | | 370/252 |
| 7,903,644 | B1* | 3/2011 | Lipschutz | H04L 49/103 |
| | | | | 370/429 |
| 9,961,022 | B1* | 5/2018 | Kahn | H04L 47/6215 |
| 10,263,919 | B1* | 4/2019 | Matthews | H04L 49/9047 |
| 10,868,768 | B1* | 12/2020 | Matthews | H04L 47/22 |
| 2011/0107178 | A1* | 5/2011 | Nakamura | G11B 20/1833 |
| | | | | 714/E11.032 |
| 2012/0120254 | A1* | 5/2012 | Tan | H04L 65/65 |
| | | | | 348/184 |
| 2015/0311980 | A1 | 10/2015 | Kuwano et al. | |
| 2016/0294508 | A1* | 10/2016 | Takeuchi | H04L 1/0009 |

* cited by examiner

SIGNAL TRANSFER DEVICE AND SIGNAL TRANSFER METHOD

CROSS-REFERENCE TO RELATED APPLICATIONS

This application is a 371 U.S. National Phase of International Application No. PCT/JP2019/022013 filed on Jun. 3, 2019. The entire disclosures of the above applications are incorporated herein by reference.

TECHNICAL FIELD

The present invention relates to a signal transfer device and a signal transfer method.

BACKGROUND ART

Examples of networks constituting a cellular system include mobile fronthaul (MFH), mobile backhaul (MBH), and the like.

MBH is a network between a base station and an aggregate station that controls the base station, and is constructed with a layer-2 switch, a router, and the like.

On the other hand, MFH is a configuration between a radio control device and a radio device in a configuration in which a base station is deployed separately from the radio control device and the radio device. Although a point-to-point connection is employed in this section in the related art, a network built with a passive optical network (PON) (see Patent Literature 1) or with a configuration in which layer-2 switches are connected in multiple layers (see Non Patent Literature 1) has been discussed, which can achieve efficient accommodation compared to a point-to-point connection.

CITATION LIST

Patent Literature

Patent Literature 1: JP 5876941 B

Non Patent Literature

Non Patent Literature 1: "IEEE Standard for Local and Metropolitan Area Networks-Time-Sensitive Networking for Fronthaul," IEEE Standards Association, 7 May 2018

SUMMARY OF THE INVENTION

Technical Problem

However, in a signal transfer device such as a layer-2 switch or a router deployed between a radio device and a radio control device of the related art, sufficient statistical multiplexing effects may not be obtained because signals are increasingly discarded due to a traffic concentration, or the like.

An object of the present invention is to provide a signal transfer device and a signal transfer method capable of increasing the number of multiplexed signals while reducing discarded signals.

Means for Solving the Problem

A signal transfer device according to an aspect of the present invention includes a buffer unit including a plurality of buffers, a sorting unit configured to sort an input signal to any of the plurality of buffers based on header information, a rate calculation unit configured to calculate a rate at which the input signal is read from each of the plurality of buffers based on burst information of the input signal, an adjustment unit configured to adjust a rate at which the input signal is read from each of the plurality of buffers based on the rate calculated by the rate calculation unit, and a transfer unit configured to transfer the signal read from each of the plurality of buffers.

In addition, a signal transfer method according to an aspect of the present invention includes sorting an input signal to any of a plurality of buffers based on header information, calculating a rate at which the input signal is read from each of the plurality of buffers based on burst information of the input signal, adjusting a rate at which the input signal is read from each of the plurality of buffers based on the calculated rate, and transferring the signal read from each of the plurality of buffers.

DESCRIPTION OF EMBODIMENTS

First, the background to the present invention will be described. Here, although a signal transfer device and a signal transfer method will be described using MFH as an example, the signal transfer device and the signal transfer method may be applied to MBH with a radio device read as a base station and with a radio control device read as an aggregate station. In addition, layer 2 switches, routers, and the like all will be assumed as signal transfer devices without distinguishing them from each other.

For example, as a network configured of a plurality of signal transfer devices, some accommodate communication between a plurality of radio devices and radio control devices. First, merging of communication in a radio communication system equipped with such a network will be described.

Figure 5:
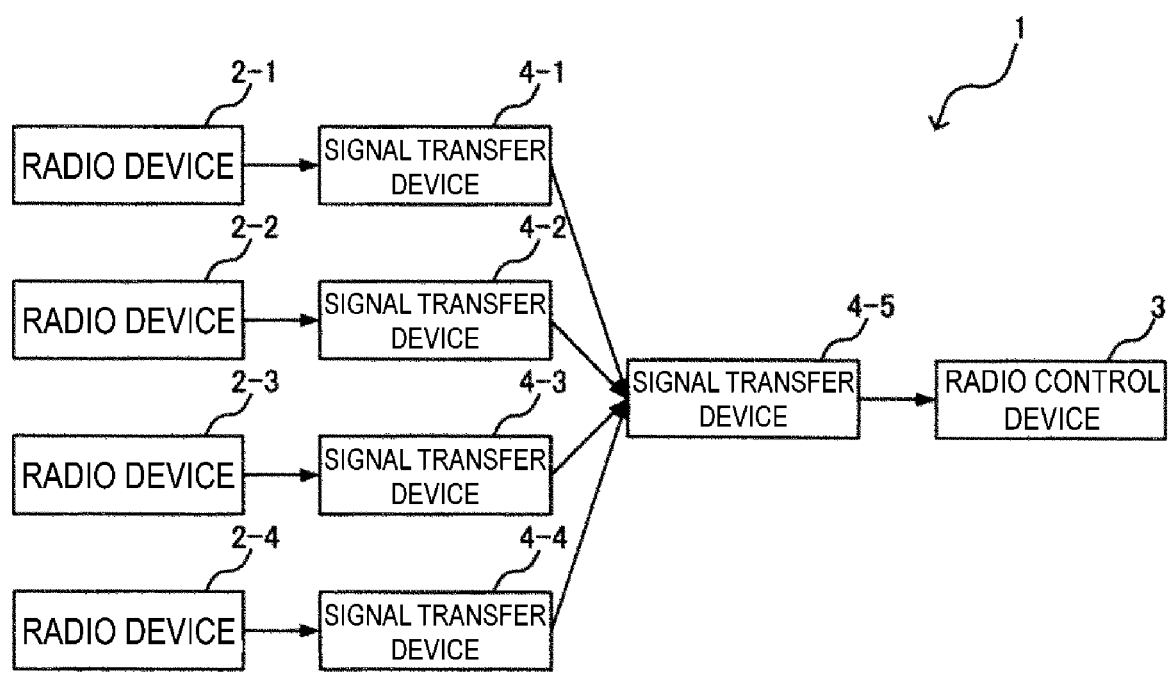
FIG. 5 is a diagram illustrating an example of a configuration of a radio communication system.

FIG. 5 is a diagram illustrating an example of a configuration of a radio communication system 1. The radio communication system 1 includes, for example, four radio devices 2-1 to 2-4 and one radio control device 3 that controls the radio devices 2-1 to 2-4. Further, in the radio communication system 1, signal transfer devices 4-1 to 4-5 are provided between the radio devices 2-1 to 2-4 and the radio control device 3.

For example, the signal transfer devices 4-1 to 4-4 receive signals transmitted by the radio devices 2-1 to 2-4, respectively, and transfer the signals to the signal transfer device 4-5. The signal transfer device 4-5 transfers the signals received from the signal transfer devices 4-1 to 4-4 to the radio control device 3. In a case in which a plurality of constituent components, such as the signal transfer devices 4-1 to 4-5, do not need to be distinguished from each other, the constituent components will be simply referred to as signal transfer devices 4, or the like.

Figure 6:
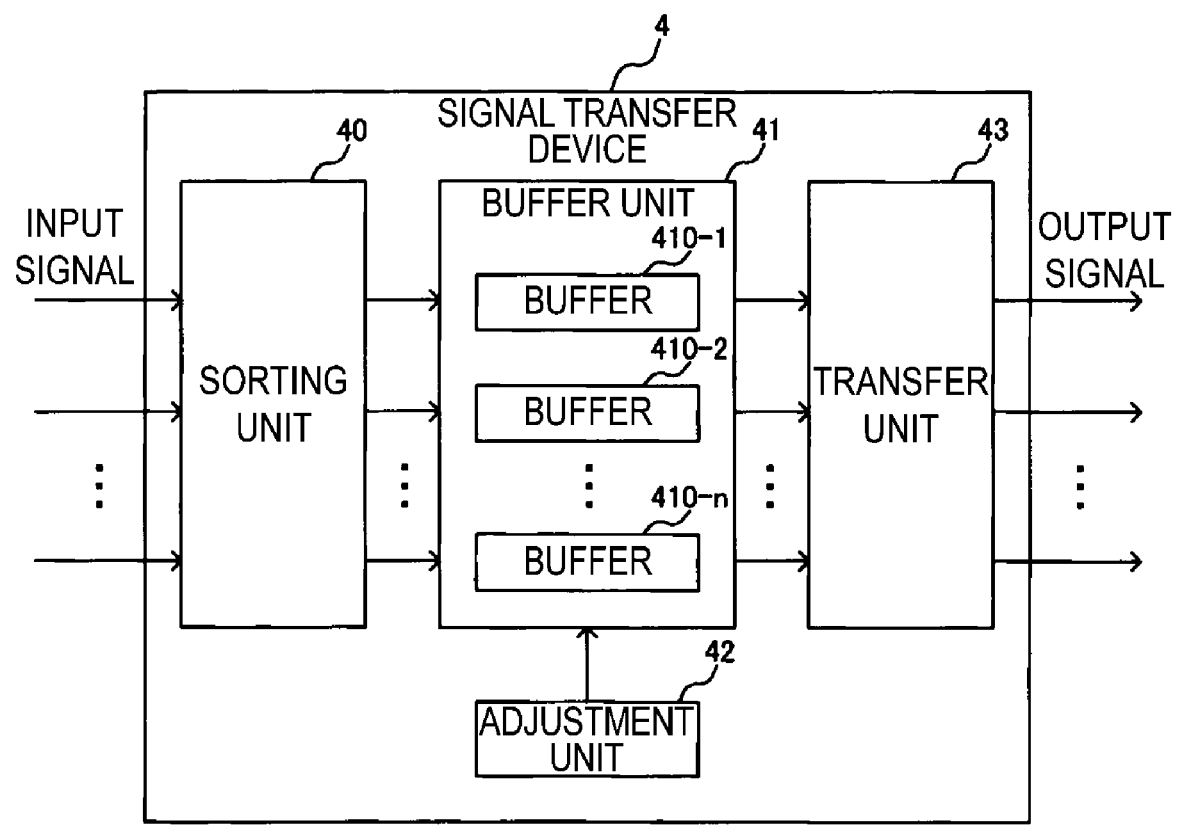
FIG. 6 is a diagram illustrating an example of a configuration of a signal transfer device.

FIG. 6 is a diagram illustrating an example of a configuration of each signal transfer device 4. As illustrated in FIG. 6, the signal transfer device 4 includes a sorting unit 40, a buffer unit 41, an adjustment unit 42, and a transfer unit 43.

The sorting unit 40 sorts input signals to any of buffers 410-1 to 410-n, which will be described below, based on header information.

The buffer unit 41b includes, for example, n buffers 410-1 to 410-n, and the buffers 410-1 to 410-n hold (store) the signals sorted by the sorting unit 40.

The adjustment unit 42 adjusts each rate at which the buffers 410-1 to 410-n read the held signals.

The transfer unit 43 reads the signals held in the buffers 410-1 to 410-n at the reading rates adjusted by the adjustment unit 42 and transfers the read signals.

In the radio communication system 1 illustrated in FIG. 5, signals in the uplink communication traffic output by the signal transfer devices 4-1 to 4-4 are merged at the signal transfer device 4-5. For the sake of simple explanation, it is assumed that interfaces included in the signal transfer devices 4-1 to 4-5 have a maximum transmission rate of 10 Gbps. That is, if a rate of total traffic flowing from the radio devices 2-1 to 2-4 is 10 Gbps or lower, the signal transfer device 4-5 can accommodate all signals on one interface.

Figure 7:
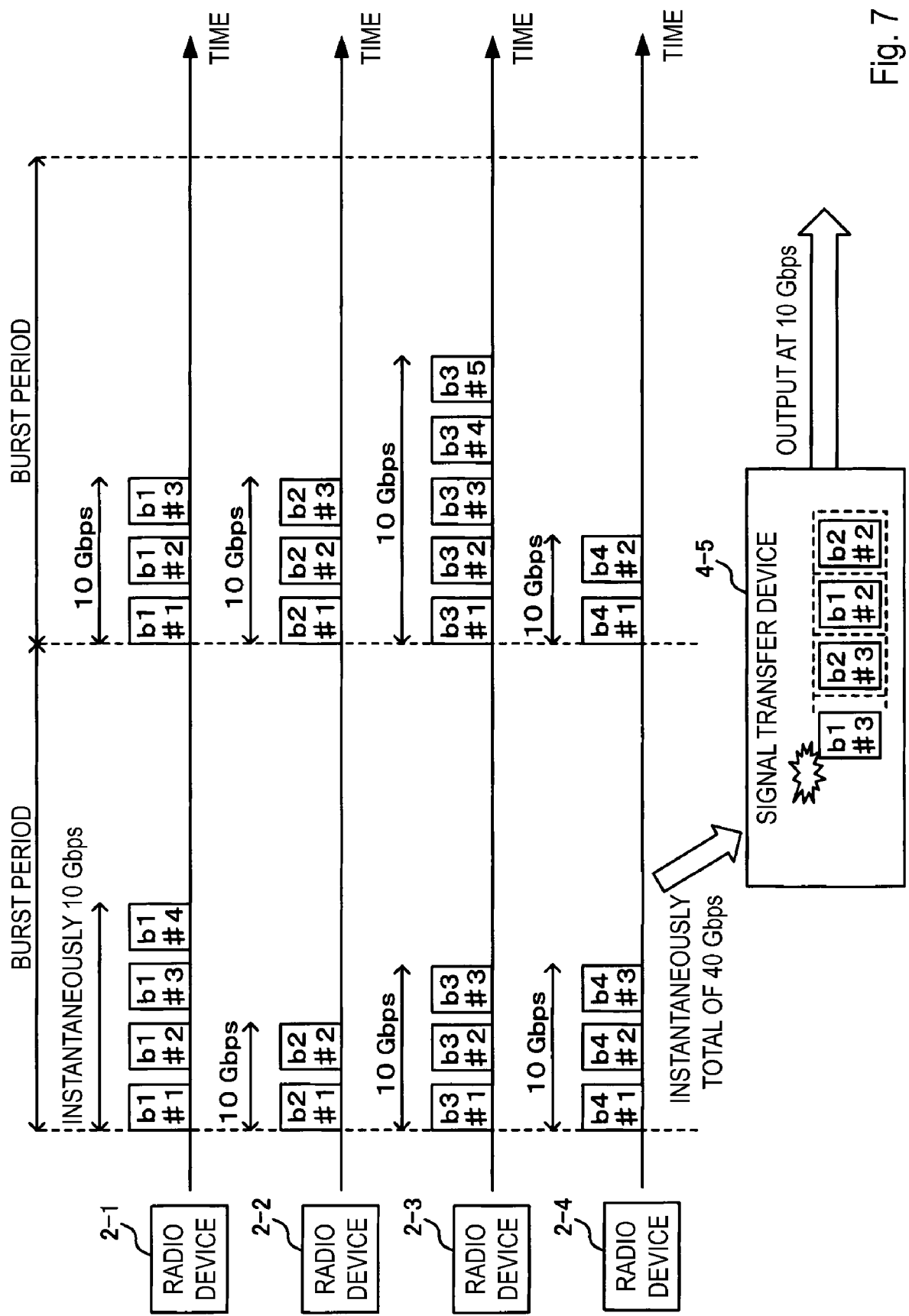
FIG. 7 is a diagram illustrating an example of an operation of the radio communication system.

On the other hand, traffic flowing through a mobile network has burst properties. FIG. 7 is a diagram illustrating an example of an operation of the radio communication system 1 with the burst properties. As illustrated in FIG. 7, in communication with the burst properties, signals are instantaneously transmitted at a maximum interface transmission rate.

Thus, in a case in which a plurality of signals merge at a point like the signal transfer device 4-5, it is likely that an input transmission rate of the signal transfer device 4-5 will instantaneously exceed output transmission rates of the individual signal transfer devices 4-1 to 4-4.

At this time, if the signal transfer device 4-5 does not have a sufficient quantity of buffers, buffer overflow occurs, and frames are lost (signals are discarded). In the example illustrated in FIG. 7, signals are instantaneously input at a total rate of 40 Gbps to the interface with the maximum transmission rate of 10 Gbps due to merging of the signals, which causes the signals to be discarded. In addition, although the signal transfer device 4-5 may be configured to have a sufficient quantity of buffers to prevent buffer overflow, the circuit scale may increase in that case.

Thus, the radio communication system 1 may reduce discarded signals through shaping. Shaping is an operation in which a maximum output transmission rate, which is equal to or below a maximum transmission rate of an interface, is determined, and in a case in which an input traffic rate instantaneously exceeds the maximum output transmission rate, frames are accumulated and delayed and the output transmission rate is dropped to a predetermined rate.

Figure 8:
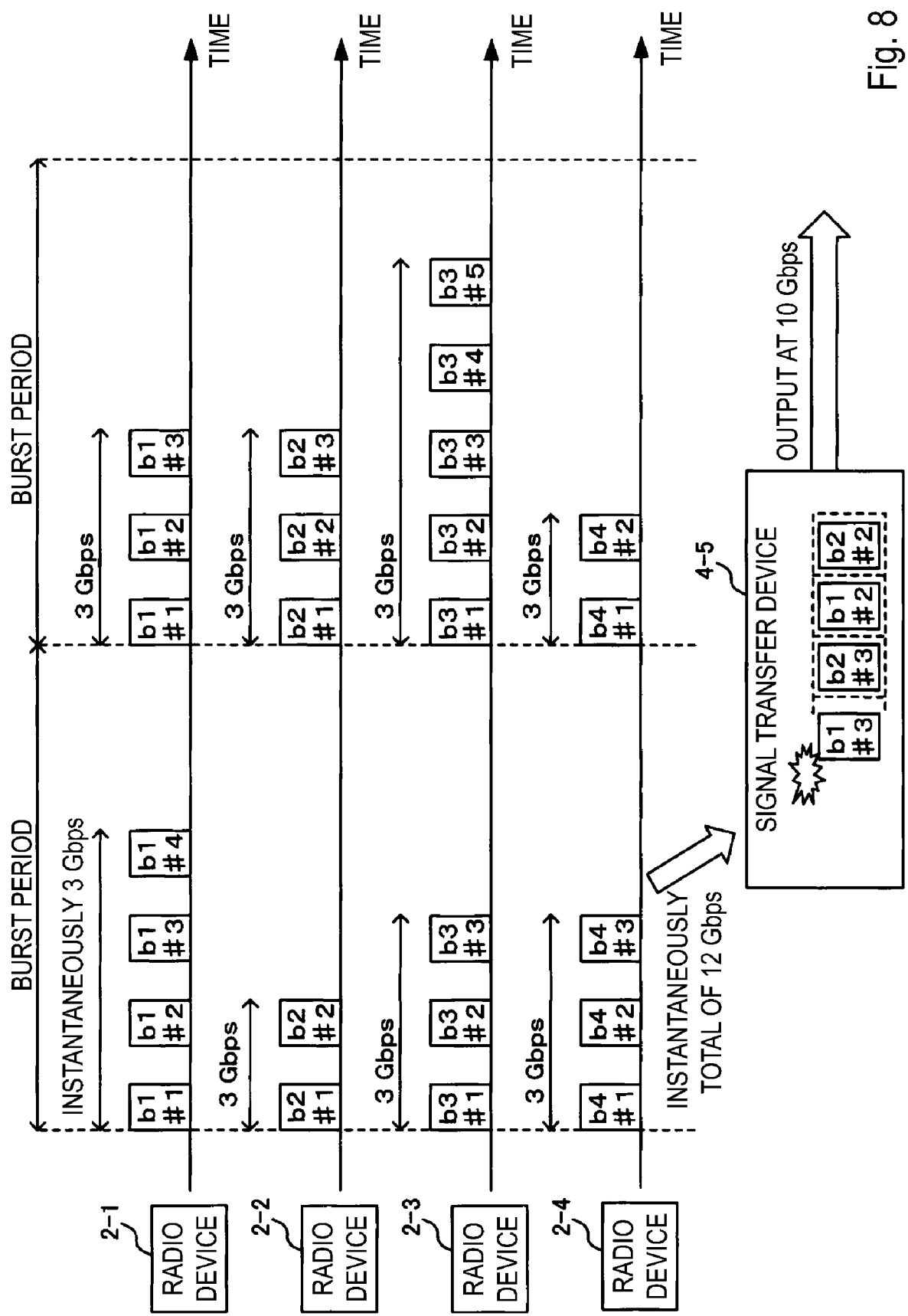
FIG. 8 is a diagram illustrating an example of an operation in which the radio communication system performs shaping.

FIG. 8 is a diagram illustrating an example of an operation in which the radio communication system 1 performs shaping. As illustrated in FIG. 8, in the radio communication system 1, the signal transfer devices 4-1 to 4-4 may drop a signal transmission rate by performing shaping before transferring signals to the signal transfer device 4-5.

Here, each of the signal transfer devices 4-1 to 4-4 includes an interface with a transmission rate of 10 Gbps, and delays a signal using the buffer unit 41 to keep an output transmission rate lower than or equal to 3 Gbps. In other words, each of the signal transfer devices 4-1 to 4-4 has the adjustment unit 42 to keep a maximum average transmission rate at 3 Gbps within one burst period.

In a case in which the amount of traffic from the radio devices 2-1 to 2-4 is transferred at a higher rate than that of the signal transfer devices 4-1 to 4-4, signals in a burst period will be transmitted across the next burst period. When this state continues, the signal transfer devices 4-1 to 4-4 continue to accumulate frames in the buffer units 41, causing buffer overflow.

Thus, when each of the radio devices 2-1 to 2-4 outputs a signal at 3 Gbps, the signal transfer devices 4-1 to 4-4 need to set the output transmission rate from the buffer unit 41 to a minimum of 3 Gbps using the adjustment unit 42.

In this case, if the output transmission rate at the beginning of the burst period becomes 3 Gbps and the amount of traffic is low, there is a section in which no frame flows later in the burst period as illustrated in FIG. 8.

If such signals are transferred from the signal transfer devices 4-1 to 4-4 to the signal transfer device 4-5 at the same time, signals are instantaneously input to the signal transfer device 4-5 at 12 Gbps. At this time, because the signals are input (at 12 Gps) in excess of the maximum transmission rate (10 Gbps), the signal transfer device 4-5 can have frame loss reduced more than the example illustrated in FIG. 7, but if a sufficient quantity of buffers is not provided, buffer overflow occurs, resulting in frame loss.

If a sufficient quantity of buffers is provided to prevent buffer overflow, the circuit scale of the signal transfer devices increases. In addition, if transmission rates of traffic flowing from the signal transfer devices 4-1 to 4-4 vary, the signal transfer device 4-5 can efficiently accommodate the traffic taking advantage of statistical multiplexing effects. However, a transmission rate at the beginning of a burst period should be fixed (at 3 Gbps) in the related art, and therefore, it is not possible to perform accommodation taking advantage of the statistical multiplexing effects.

Also, as a solution that prevents buffer overflow, a method is conceivable in which signals from the signal transfer devices 4-1 to 4-4 to the signal transfer device 4-5 are controlled such that the they do not reach at the same time. However, in such a method, it is necessary to examine arrival timings of frames coming from each of the signal transfer devices deployed in the preceding stage at each signal transfer device on the network, and to control output timings of the frames at each signal transfer device, which complicates operations of the system or a user.

Next, a signal transfer device that transfers a signal (a frame or the like) using burst information will be described.

Figure 1:
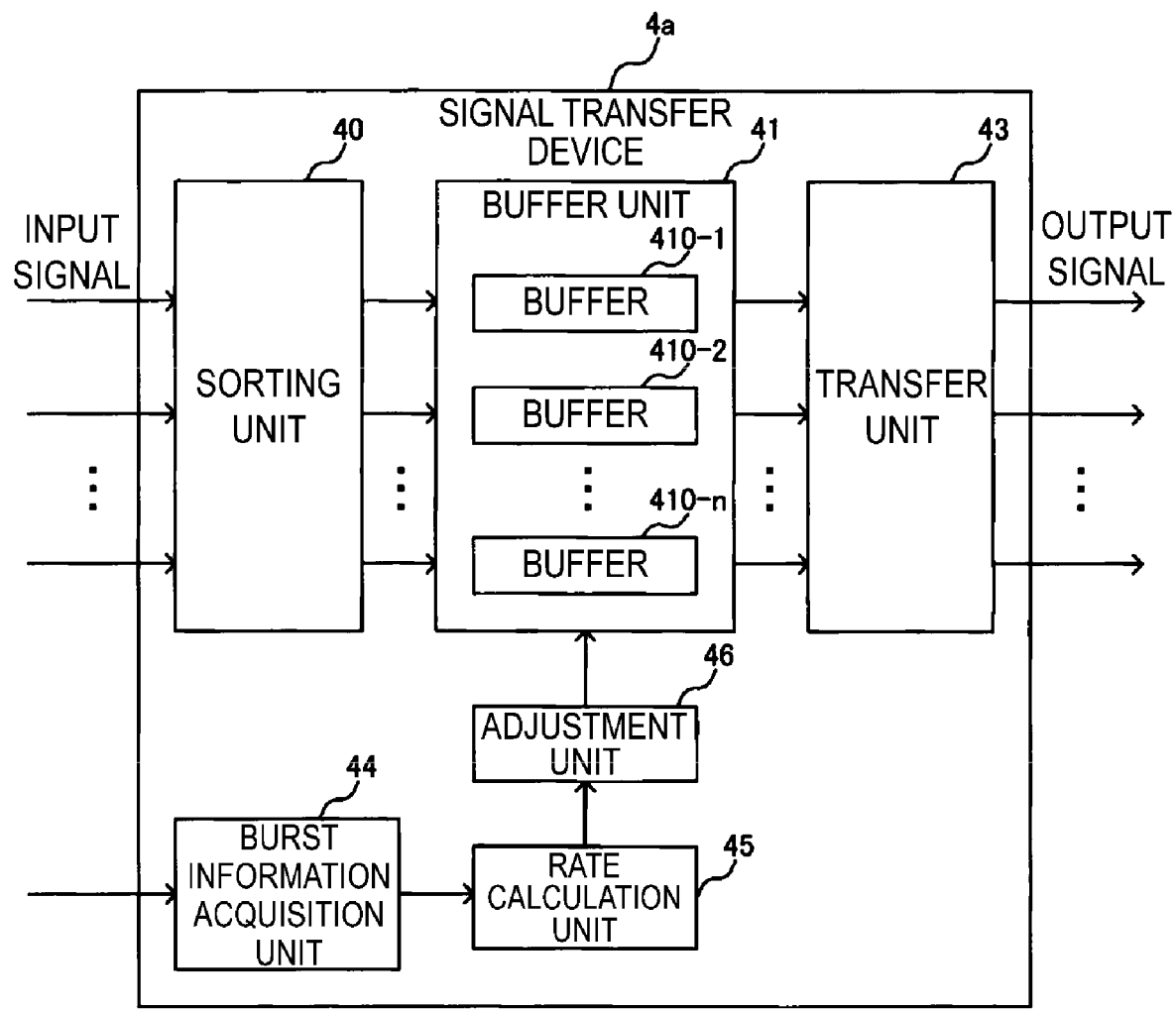
FIG. 1 is a diagram illustrating a first configuration example of a signal transfer device that uses burst information.

FIG. 1 is a diagram illustrating a first configuration example (signal transfer device 4a) of a signal transfer device that transfers a signal using burst information. The signal transfer device 4a replaces each of the signal transfer devices 4-1 to 4-5 in the radio communication system 1 illustrated in FIG. 5, for example, to constitute a radio communication system.

For example, four signal transfer devices 4a receive signals transmitted by the radio devices 2-1 to 2-4, and transfer the signals to another signal transfer device 4a. The other signal transfer device 4a transfers the signals received from each of the four signal transfer devices 4a to a radio control device 3.

Each signal transfer device 4a includes a sorting unit 40, a buffer unit 41, a transfer unit 43, a burst information acquisition unit 44, a rate calculation unit 45, and an adjustment unit 46 as illustrated in FIG. 1. Further, the same reference numerals are given to constituent components of the signal transfer device 4a illustrated in FIG. 1 that are substantially the same as those of the signal transfer device 4 illustrated in FIG. 6.

The burst information acquisition unit 44 acquires burst information from the outside and outputs the acquired burst information to the rate calculation unit 45. The burst information includes, for example, at least any of a total frame length and a burst length within the burst, as well as a burst period.

The rate calculation unit 45 calculates a rate at which an input signal is read from each of buffers 410-1 to 410-*n* based on the burst information acquired by the burst information acquisition unit 44 and outputs the calculated rate to the adjustment unit 46. For example, the rate calculation unit 45 calculates a rate at which an input signal is read from the buffers 410-1 to 410-*n* so that signal (frame) intervals are equally spaced in the burst period.

The adjustment unit 46 adjusts the rate at which the input signal is read from each of the buffers 410-1 to 410-*n* based on the rate calculated by the rate calculation unit 45. For example, the adjustment unit 46 adjusts the rate at which the signal is read from the buffers 410-1 to 410-*n* in each burst period so that the signal (frame) intervals are equally spaced in the burst period.

Figure 2:
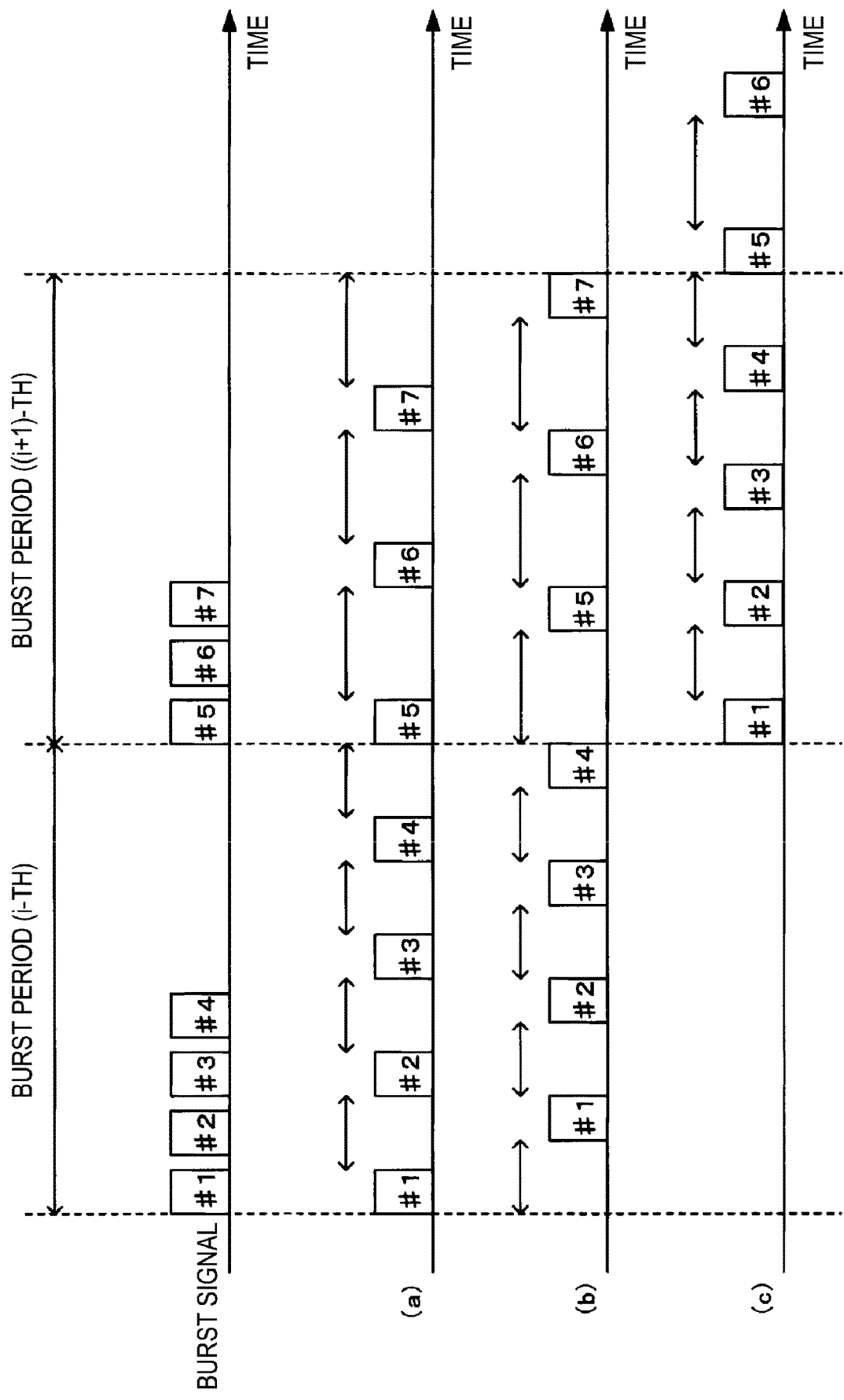
FIG. 2(a) is a diagram illustrating a first operation example in which signal intervals in burst periods are equally spaced.
FIG. 2(b) is a diagram illustrating a second operation example in which signal intervals in burst periods are equally spaced.
FIG. 2(c) is a diagram illustrating a third operation example in which signal intervals in burst periods are equally spaced.

FIG. 2 includes diagrams illustrating operation examples in which the signal transfer device 4a sets signal (frame) intervals in burst periods to be equally spaced for each burst period. FIG. 2(*a*) is a diagram illustrating a first operation example in which signal intervals in burst periods are equally spaced. FIG. 2(*b*) is a diagram illustrating a second operation example in which signal intervals in burst periods are equally spaced. FIG. 2(*c*) is a diagram illustrating a third operation example in which signal intervals in burst periods are equally spaced. Further, the burst signals illustrated at the top are a signal in an i-th burst period input to the signal transfer device 4a (a signal before rate adjustment) and a signal in an (i+1)-th burst period.

In the first operation example illustrated in FIG. 2(*a*), the signal transfer device 4a starts outputting first frames (#1 and #5) in the burst periods at the same time as a burst start time, similarly to the input signal (the signal before rate adjustment). At this time, the signal transfer device 4a makes the time interval between the last frame (#4) in the burst period and the previous frame (#3) the same as the time interval between the last frame (#4) and the next burst start time (the first frame (#5) in the next burst period).

In the second operation example illustrated in FIG. 2(*b*), the signal transfer device 4a finishes the output of the last frame (#4) in the burst period at the same time as the end time of the burst period. In addition, the signal transfer device 4a makes the time interval between the first frame (#5) in the burst period and the next frame (#6) the same as the time interval between the first frame (#5) and the last time in the previous burst period (the last frame (#4) in the one burst period before).

In the second operation example illustrated in FIG. 2(*b*), a delay time of each frame increases compared to the first operation example illustrated in FIG. 2(*a*). However, the signal transfer devices 4-1 to 4-4 in the radio communication system 1 (FIG. 5) may be replaced with a configuration in which the signal transfer device 4a that operates as in the first operation example and the signal transfer device 4a that operates as in the second operation example are combined.

In this case, the number of frames arriving at the signal transfer device 4-5 at the same time can be further reduced compared to a case in which all of the signal transfer devices 4-1 to 4-4 in the radio communication system 1 are replaced only with the signal transfer device 4a that operates as in the first operation example, or only with the signal transfer device 4a that operates as in the second operation example. That is, there is a possibility of further reducing a quantity of buffers of the signal transfer device 4-5.

The first operation example and the second operation example illustrated in FIGS. 2(*a*) and 2(*b*) are realized, for example, by the burst information acquisition unit 44 of the signal transfer device 4a (FIG. 1) obtaining burst information in advance from an external radio device 2, the radio control device 3, or the like.

However, in the first operation example and the second operation example, the rate of reading from the buffer 410 to be adjusted by the adjustment unit 46 should be calculated by the rate calculation unit 45 at the start time of the burst period or after a very small period of time elapses from the start of the burst period.

In the third operation example illustrated in FIG. 2(*c*), the signal transfer device 4a performs the same operation as the first operation example illustrated in FIG. 2(*a*) after one burst period is delayed. In this case, the signal transfer device 4a may calculate the interval of signals to be output in the (i+1)-th burst period during the i-th burst period.

Figure 3:
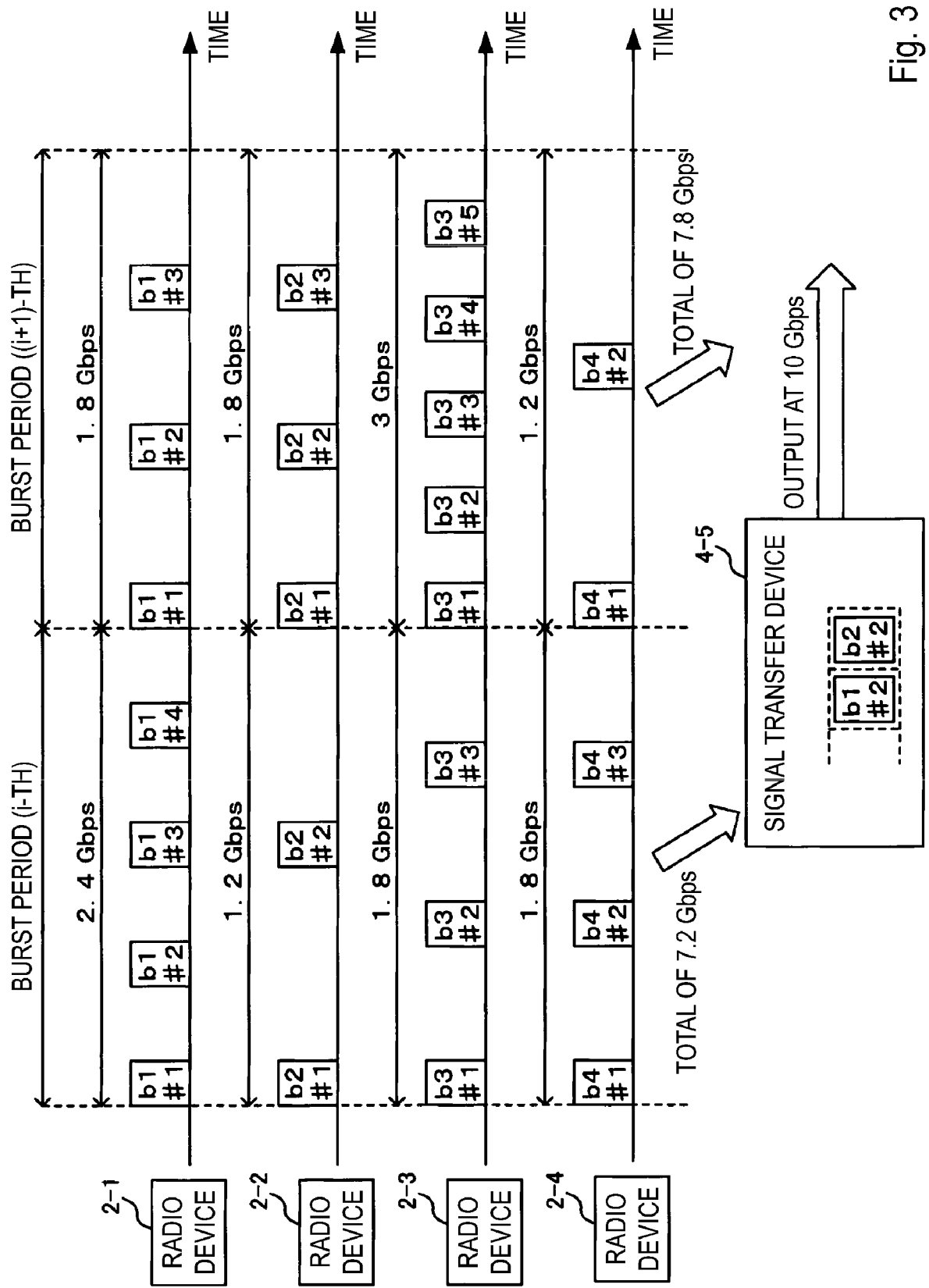
FIG. 3 is a diagram illustrating an example of an operation of a radio communication system in which signal transfer devices are replaced only with signal transfer devices operating as in the first operation example.

FIG. 3 is a diagram illustrating an operation example of the radio communication system 1 in which all of the signal transfer devices 4-1 to 4-4 are replaced only with the signal transfer device 4a that operates as in the first operation example illustrated in FIG. 2(*a*).

In the radio communication system 1 in which the signal transfer devices are replaced only with the signal transfer device 4a that operates as in the first operation example, four signal transfer devices 4a output frames output by the respective radio devices 2-1 to 2-4 at equal time intervals in each burst period as illustrated in FIG. 3.

For example, in the i-th burst period, the four signal transfer devices 4a set a rate of a signal output by the radio device 2-1 to 2.4 Gbps, a rate of a signal output by the radio device 2-2 to 1.2 Gbps, and a rate of signals output by the radio devices 2-3 and 2-4 to 1.8 Gbps, respectively. At this time, the signals input from the four signal transfer devices 4a to the signal transfer device 4-5 have a total rate of 7.2 Gbps.

In addition, in the (i+1)-th burst period, the four signal transfer devices 4a set a rate of signals output by the radio devices 2-1 and 2-2 to 1.8 Gbps, a rate of a signal output by the radio device 2-3 to 3 Gbps, and a rate of a signal output by the radio device 2-4 to 1.2 Gbps, respectively. At this time, the signals input from the four signal transfer devices 4a to the signal transfer device 4-5 have a total rate of 7.8 Gbps.

Although the total output rate instantaneously reaches 12 Gbps when the signal transfer devices 4-1 to 4-4 perform shaping to set 3 Gbps as a limit rate (see FIG. 8) in the radio communication system 1 as described above, the total output rate does not exceed 10 Gbps when the signal transfer devices are replaced with the four signal transfer devices 4a (FIG. 3).

In other words, the transmission rate of the signals input to the signal transfer device 4-5 is minimized in any of the burst periods, and it is lower than or equal to the maximum transmission rate of the interface (10 Gbps), which prevents frame loss. When the transmission rate of the signals input to the signal transfer device 4-5 is minimized, the radio communication system 1 is likely to accommodate traffic from a new signal transfer device, taking advantage of the statistical multiplexing effects.

Figure 4:
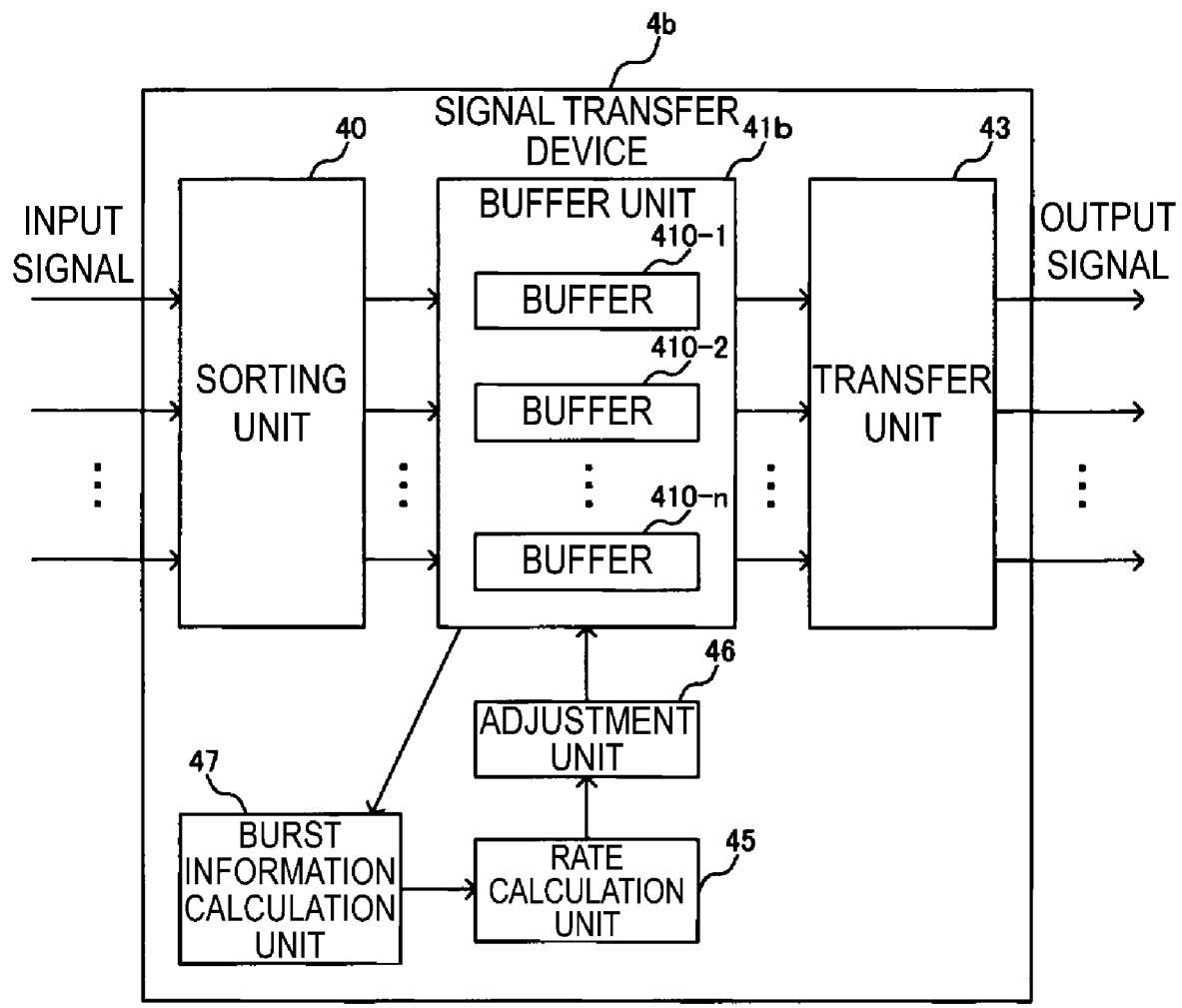
FIG. 4 is a diagram illustrating a second configuration example of the signal transfer device that uses burst information.

FIG. 4 is a diagram illustrating a second configuration example (signal transfer device 4b) of the signal transfer device that transfers a signal using burst information. The signal transfer device 4b replaces each of the signal transfer devices 4-1 to 4-5 in the radio communication system 1 illustrated in FIG. 5, for example, to constitute the radio communication system.

For example, four signal transfer devices 4b receive signals transmitted by the radio devices 2-1 to 2-4 and transfer the signals to another signal transfer device 4b. The other signal transfer device 4b transfers the signals received from each of the four signal transfer devices 4b to the radio control device 3.

As illustrated in FIG. 4, the signal transfer device 4b includes a sorting unit 40, a buffer unit 41b, a transfer unit 43, a rate calculation unit 45, an adjustment unit 46, and a burst information calculation unit 47. Further, the same reference numerals are given to substantially the same constituent components of the signal transfer device 4b illustrated in FIG. 4 as those of the signal transfer device 4a illustrated in FIG. 1.

The buffer unit 41b includes, for example, n buffers 410-1 to 410-n, and the buffers 410-1 to 410-n hold (store) the signals sorted by the sorting unit 40. In addition, the buffer unit 41b outputs the signals held by the buffers 410-1 to 410-n to the burst information calculation unit 47.

The burst information calculation unit 47 calculates burst information from the signals input from the buffer unit 41b, and outputs the calculated burst information to the rate calculation unit 45. Then, the rate calculation unit 45 calculates a rate at which the input signals are read from each of the buffers 410-1 to 410-n based on the burst information calculated by the burst information calculation unit 47 and outputs the calculated rates to the adjustment unit 46.

For example, the rate calculation unit 45 calculates the rate at which frames are read from each of the buffers 410-1 to 410-n at an i-th burst illustrated in FIG. 2(c) until the i-th burst period ends based on the burst information calculated by the burst information calculation unit 47.

Then, the buffer unit 41b transmits the frames of the i-th burst in the (i+1)-th burst period (FIG. 2(c)). In other words, the signal transfer device 4b has a longer frame delay than the signal transfer device 4a that operates as in the first operation example and the second operation example illustrated in FIGS. 2(a) and 2(b). However, because the signal transfer device 4b calculates the burst information from the frames held in the buffer unit 41b, it is not necessary to acquire burst information from the outside.

Further, when the read rate for the i-th burst is adjusted, the signal transfer device 4b may predict and calculate the i-th burst information based on the zero-th to (i−1)-th burst information. In this case, the signal transfer device 4b can implement the operations of the first operation example and the second operation example illustrated in FIGS. 2(a) and 2(b).

In addition, the signal transfer device 4b may further include the burst information acquisition unit 44 illustrated in FIG. 1. In other words, in a case in which the burst information calculation unit 47 and the burst information acquisition unit 44 are included, the signal transfer device 4b may acquire the burst information that is obtained from the outside using the burst information acquisition unit 44, and may calculate the burst information that is not obtained from the outside using the burst information calculation unit 47. Furthermore, the signal transfer device 4b may perform calculation to correct the burst information using the burst information calculation unit 47 while acquiring the burst information using the burst information acquisition unit 44.

Hereinafter, processing using burst information will be described in detail with, as an example, a case in which the signal transfer device 4b further includes the burst information acquisition unit 44 illustrated in FIG. 1.

For the processing using burst information, for example, a burst period is set as T[s], the number of frames in the i-th burst as a frame length of a j-th frame in the i-th burst as $p_{i,j}$ [byte] ($n_i \geq j \geq 1$), an interval between the j-th and (j+1)-th frames as $a_{i,j}$ [byte] ($n_i-1 \geq j \geq 1$), and a transmission rate of the interface of the signal transfer device 4b as r [bit/sec].

A burst length $B_i$[s] of the i-th burst (where i is an integer equal to or greater than 1) is $B_i=8 \ (\Sigma(j=1:n_i)p_{i,j}+\Sigma(j=1:n_{i-1})a_{i,j})/r$.

A plurality of patterns such as, for example, (1) to (3) below are conceivable for the specific operation performed by the signal transfer device 4b.

(1) To equally space frames in the burst period, the rate calculation unit 45 calculates $t_1=(T-\Sigma(j=1:n_i)p_{i,j}/r)/n$. Then, the adjustment unit 46 adjusts each frame spacing to L. In this case, the burst information acquisition unit 44 needs to obtain information on the burst period T, a total frame length $\Sigma(=1:n_i)p_{i,j}$ in the burst, and the number of frames $n_i$ in the burst.

(2) If the signal is an Ethernet frame, the frame spacing is at least 12 bytes. At this time, the frame spacing in the burst is thought to be a value close to this value (12 bytes). Thus, if the frame spacings of the input signals in the burst are all the same and all $a_{i,j}$ are equal to a [byte] in the range ($n-1 \geq j \geq 1$), the rate calculation unit 45 calculates $t_2=(T-B_i+8(n-1) \ a/r)/n$ in order to equally space frames in the burst. Then, the adjustment unit 46 adjusts each frame spacing to $t_2$. In this case, the burst information acquisition unit 44 needs to obtain information on the burst period T, the burst length B, and the number of frames $n_i$ in the burst.

(3) If the signal is an Ethernet frame, the frame length is 1518 bytes at the longest. At this time, a frame length in the burst is thought to be a value close to this value (1518 bytes). Thus, the burst information calculation unit 47 estimates the number of frames as $n_i=(rB_i/8+a)/(a+b)$ if all of the burst spacings in the burst are the same, the frame lengths in the burst are equal, and all $p_{i,j}$ are equal to b [bytes] in the range of ($n_i \geq j \geq 1$). Thus, the rate calculation unit 45 calculates $t_3=(T-B_i+8(n-1) \ a/r)/((rB_i/8+a)/(a+b))$ in order to equally space the frames in the burst. Then, the adjustment unit 46 adjusts each frame spacing to $t_3$. In this case, the burst information acquisition unit 44 needs to obtain information on the burst period T and the burst length B. Although a frame length of the frame flowing at the end of the burst is not likely to be b due to the adjustment, if the number of frames $n_i$ is sufficiently large, the effect of the adjustment is thought to be negligible.

Next, a method of acquiring, by the burst information acquisition unit 44, burst information will be described in detail. The burst information acquisition unit 44 acquires burst information from the external radio device 2, the radio control device 3 (FIG. 5), or the like.

For example, in a case in which the radio communication system 1 is a Long Term Evolution (LTE) system, scheduling is performed in the MAC layer at intervals of 1 ms and communication is performed between the radio device 2 and the radio control device 3 based on the scheduling results.

Thus, when the burst information acquisition unit 44 checks the scheduling information, it is thought that a burst period T in the burst of traffic flowing in the signal transfer device $4b$, a total frame length $\Sigma(=1:n_t)p_{i,j}$, a burst length B, the number of frames and the like can be acquired.

In addition, although scheduling is performed in the MAC layer at the intervals of 1 ms, and the interval of 1 ms is constituted by 14 OFDM symbols, and thus, it is thought that a burst period is determined with a layer deployed in the radio device 2 and the radio control device 3, that is, a function division point.

In other words, in a case in which a function division point is set near the MAC layer, traffic flowing in the signal transfer device $4b$ is assumed to have burst signals at intervals close to the interval of 1 ms. However, in a case in which a function division point is set near the lower PHY layer in an FFT/IFFT, or the like, an interval of approximately an Orthogonal Frequency Division Multiplexing (OFDM) symbol is assumed.

Further, although the case in which the burst information acquisition unit 44 acquires the burst information from the MAC layer has been described in the example described above, the burst information acquisition unit 44 may acquire burst information from another layer.

Next, a method of calculating, by the burst information calculation unit 47, burst information will be described in detail. Because burst signals exist in the frame at the beginning of the burst period at all times, a burst period T can be estimated if the time at which the head frame has been detected is confirmed and the interval is calculated.

In a case of bursts, the spacing between the first frame and the next frame in a burst is very short, but the spacing between the first frame in the burst and the last frame in the previous burst is relatively long. For this reason, it is easy to estimate which frame is the head if the latter spacing is compared.

The burst information calculation unit 47 can calculate a total frame length $\Sigma(j=1:n_t)p_{i,j}$ in a burst by checking a quantity of data held in the buffer unit $41b$.

In addition, the burst information calculation unit 47 can check the time at which the first frame in the burst period has arrived and the time at which the last frame in the burst period has arrived, and calculate a burst length $B_i$ using the spacing.

Furthermore, the burst information calculation unit 47 can determine which frame is the last frame of the burst period based on whether the time in which no other frames are received exceeds a certain value because no other frame is received for a while after the last frame of the burst period is received.

In addition, the signal transfer device $4b$ may be configured such that a frame counter that counts the number of frames is provided in the sorting unit 40 to calculate the number of frames $n_i$. The number of frames $n_i$ may be estimated to be $n_i=(rB_i/8+a)/(a+b)$ as described above.

As described above, the signal transfer device $4a$ and the signal transfer device $4b$ can increase the number of multiplexed signals because an instantaneous transmission rate is minimized in the burst period by adjusting the output transmission rate for each burst to have the signals (frames) equally spaced in the burst period based on the burst information. In addition, the signal transfer device $4a$ and the signal transfer device $4b$ can easily obtain the statistical multiplexing effects and increase the number of multiplexed signals because they can have instantaneous transmission rates varying in accordance with the burst length (amount of traffic).

Further, the above-described signal transfer device $4a$ and the signal transfer device $4b$ are not limited to being used in the radio communication system 1 provided with the radio device 2 and the radio control device 3 and are applicable to another radio communication system as well.

For example, the signal transfer device $4a$ and the signal transfer device $4b$ are applicable as signal transfer devices that accommodate an F1 interface between a radio device and a radio control device even in a configuration in which only a packet data convergence protocol (PDCP) layer is deployed for the radio control device and radio link control (RLC) and lower layers are deployed in the radio device.

In addition, the signal transfer device $4a$ and the signal transfer device $4b$ are applicable as signal transfer devices that accommodate a common public radio interface (eCPRI) interface between a radio device and a radio control device even in a configuration in which only a part of the PHY layer is deployed in the radio device and the higher layers are deployed in the radio control device.

In addition, the signal transfer device $4a$ and the signal transfer device $4b$ are also applicable to any networks of a ring type, a mesh type, a honeycomb type, and the like.

Further, some or all of the units constituting the signal transfer device $4a$ and the signal transfer device $4b$ described above may be configured by hardware, or may be configured by executing a program on a processor.

In addition, in a case in which some or all of the units constituting the signal transfer device $4a$ and the signal transfer device $4b$ are configured by causing the processor to execute a program, the program may be recorded in a recording medium and supplied, or may be supplied via a network.

REFERENCE SIGNS LIST

1 Radio communication system
2-1 to 2-4 Radio device
3 Radio control device, signal transfer device
4-1 to 4-5, $4a$, $4b$ Signal transfer device
40 Sorting unit
41, $41b$ Buffer unit
43 Transfer unit
44 Burst information acquisition unit
45 Rate calculation unit
46 Adjustment unit
47 Burst information calculation unit
410-1 to 410-$n$ Buffer

The invention claimed is:

1. A signal transfer device comprising:
a buffer unit including a plurality of buffers;
a sorting unit configured to sort an input signal to any of the plurality of buffers based on header information;
a rate calculation unit configured to calculate a rate at which the input signal is read from each of the plurality of buffers based on burst information of the input signal;

an adjustment unit configured to adjust a rate at which the input signal is read from each of the plurality of buffers based on the rate calculated by the rate calculation unit; and a transfer unit configured to transfer the signal read from each of the plurality of buffers, wherein the burst information includes a burst period, and wherein the rate calculation unit calculates the rate at which the input signal is read from each of the plurality of buffers so that signal intervals are equally spaced in the burst period.

2. The signal transfer device according to claim 1, further comprising:

a burst information acquisition unit configured to acquire the burst information from an outside, wherein the rate calculation unit calculates the rate at which the input signal is read from each of the plurality of buffers based on the burst information acquired by the burst information acquisition unit.

3. The signal transfer device according to claim 1, further comprising:

a burst information calculation unit configured to calculate the burst information based on the input signal, wherein the rate calculation unit calculates the rate at which the input signal is read from each of the plurality of buffers based on the burst information calculated by the burst information calculation unit.

4. The signal transfer device according to claim 1, wherein the burst information further includes at least one of a total frame length in a burst or a burst length.

5. A signal transfer method comprising:

sorting an input signal to any of a plurality of buffers based on header information;

calculating a rate at which the input signal is read from each of the plurality of buffers based on burst information of the input signal;

adjusting a rate at which the input signal is read from each of the plurality of buffers based on the calculated rate; and transferring the signal read from each of the plurality of buffers, wherein the burst information includes a burst period, and wherein the calculating the rate includes calculating the rate at which the input signal is read from each of the plurality of buffers so that signal intervals are equally spaced in the burst period.

6. The signal transfer method according to claim 5, further comprising:

acquiring the burst information from an outside, wherein the calculating of the rate includes calculating the rate at which the input signal is read from each of the plurality of buffers based on the burst information acquired in the acquiring of the burst information.

7. The signal transfer method according to claim 5, further comprising:

calculating the burst information using the input signal, wherein the calculating of the rate includes calculating the rate at which the input signal is read from each of the plurality of buffers based on the burst information calculated in the calculating of the burst information.

8. The signal transfer method according to claim 5, wherein the burst information further includes at least one of a total frame length in a burst or a burst length.

* * * * *